United States Patent Office 3,798,274
Patented Mar. 19, 1974

3,798,274
INSECTICIDAL PHENOLS
Joseph E. Moore, Richmond, and Gustave K. Kohn, Berkeley, Calif., assignors to Chevron Research Company, San Francisco, Calif.
No Drawing. Filed Oct. 24, 1972, Ser. No. 300,082
Int. Cl. C07c 149/36
U.S. Cl. 260—609 F     4 Claims

ABSTRACT OF THE DISCLOSURE 2,6-di-(branched alkyl)-4-(halovinylthio) phenol compounds of the formula

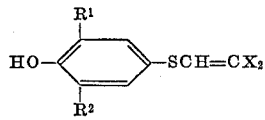

wherein $R^1$ and $R^2$ are branched alkyl groups of 3 to 6 carbon atoms and X is hydrogen, fluorine, chlorine, bromine or iodine, with the proviso that at least one X is halogen, have morphogenetic hormonal mimetic activity on mosquitos. The compounds are prepared by the reaction of a 2,6-di-(branched alkyl) phenol and a halovinylsulfenyl halide.

BACKGROUND OF THE INVENTION

Field of the invention

The present invention is concerned with insecticidal compounds which have morphogenetic hormonal mimetic activity. Compounds having morphogenetic hormonal mimetic activity exert a disrupting influence upon the normal development of insects. These compounds interfere with the normal metamorphosis of the pest insects and result in the formation of individual insects of the treated species which develop abnormally and are nonviable or sterile. This ultimately leads, indirectly at least, to the destruction of the insect population.

Description of the prior art

Chemical and Engineering News, Nov. 29, 1971, pp. 9–10, discloses the use of 2,6-di-t-butyl-4($\alpha,\alpha$-dimethylbenzyl) phenol as a mosquito larvicide.

Japanese Pat. No. 16,970, issued May 11, 1971 (Chem. Abs. 75, 98317e [1971]) discloses the use of 2,6-di-t-butyl-4-phenylthiophenol as an insecticide.

Summary of the invention

It has now been found that 2,6-di-(branched alkyl)-4-halovinylphenols are effective for the control of mosquitos when applied in insecticidally effective amounts to preadult mosquitos.

DESCRIPTION OF THE INVENTION

The phenols of the invention are represented by the Formula I

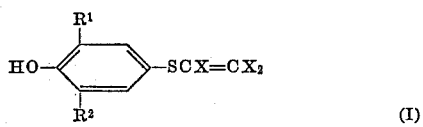

wherein $R^1$ and $R^2$ are branched alkyl groups of 3 to 6 carbon atoms attached to the aromatic ring through a secondary or tertiary carbon atom and X is hydrogen, fluorine, chlorine, bromine, or iodine, with the proviso that at least one X is a halogen. Preferably X is chlorine or bromine.

Representative branched alkyl groups which $R^1$ and $R^2$ may represent include s-propyl, s-butyl, t-butyl, t-amyl, s-hexyl, etc. $R^1$ and $R^2$ may be the same or different branched alkyl groups. Preferred $R^1$ and $R^2$ groups are attached to the aromatic ring through a secondary carbon atom (i.e., a carbon atom substituted with two alkyl groups) or a tertiary carbon atom (i.e., a carbon atom substituted with three alkyl groups).

Representative phenols of Formula I include 2,6-di-t-butyl-4-(1-chlorovinylthio) phenol,
2,6-di-t-butyl-4-(2-chlorovinylthio) phenol,
2,6-di-t-butyl-4-(2,2-dichlorovinylthio) phenol,
2,6-di-t-butyl-4-(1,2-dichlorovinylthio) phenol,
2,6-di-t-amyl-4-(trichlorovinylthio) phenol,
2,6-di-sec-butyl-4-(trichlorovinylthio) phenol,
2,6-diisopropyl-4-(1-bromovinylthio) phenol,
2,6-di-t-amyl-4-(2-bromovinylthio) phenol,
2,6-di-sec-hexyl-4-(1,2-dibromovinylthio) phenol,
2,6-di-t-butyl-4-(2,2-dibromovinylthio) phenol,
2,6-diisopropyl-4-(tribromovinylthio) phenol,
2-t-butyl-6-t-amyl-4-(1-chloro-2-bromovinylthio) phenol,
2-t-butyl-6-t-butyl-4-(1-chloro-2,2-dibromovinylthio) phenol,
2-t-butyl-6-t-butyl-4-(1-bromo2,2-dichlorovinylthio) phenol,
2,6-di-t-butyl-4-(1-fluorovinylthio) phenol,
2,6-di-t-butyl-4-(1-iodovinylthio) phenol,
2,6-di-t-butyl-4-(2-fluorovinylthio) phenol,
2,6-di-t-butyl-4-(2,2-difluorovinylthio) phenol,
2,6-di-t-butyl-4-(1-chloro-2,2-difluorovinylthio) phenol,
2,6-di-t-butyl-4-(1-iodo-2,2-dichlorovinylthio) phenol,
2,6-di-t-butyl-4-(1-fluoro-2,2-dichlorovinylthio) phenol,
2,6-di-t-butyl-4-(1,2-difluorovinylthio) phenol,
2,6-di-t-butyl-4-(trifluorovinylthio) phenol,
2,6-di-t-butyl-4-(1-bromo-2,2-difluorovinylthio) phenol, and
2,6-di-t-butyl-4-(1-fluoro-2,2-dibromovinylthio) phenol.

The phenols of Formula I are prepared by the reaction of a 2,6-di(branched alkyl) phenol and a halovinylsulfenyl chloride as depicted in the following Equation 1:

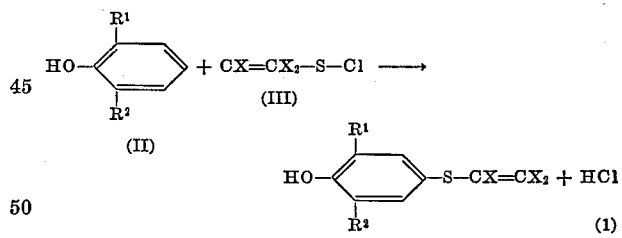

where $R^1$, $R^2$ and X have the same significance as defined in Formula I.

The reaction depicted in Equation 1 is conducted by more or less conventional procedures. The molar ratio of the phenol (II) to the sulfenyl halide (III) is substantially equimolar. The reaction is conducted in a solvent such as acetic acid. Reaction temperatures suitably vary from 0° C. to 150° C. The product is isolated by conventional methods such as extraction, distillation, crystallization, etc.

The compounds of the invention are useful as morphogenetic hormonal mimetic insecticides, particularly against mosquitos such as Aedes aegypti, Culex pipinens, Quinque fasciatus and Culiseta inornata.

The compounds are very potent and are used at extremely low concentrations. For example, compositions containing 100 p.p.m. to 0.01 p.p.m., preferably from 5 p.p.m. to 0.1 p.p.m., are effective for the control of insects However, the effective concentration depends in part on the mode of application and the particular insect.

The compounds may be applied in either liquid or solid formulations to the pre-adult insects or their environment. For example, they may be sprayed or otherwise applied directly to plants or aqueous bodies so as to effect control of insects coming into contact therewith.

Formulations of the compounds of this invention will comprise a toxic amount of one or more of the compounds and a biologically inert carrier. Usually they will also contain a wetting agent. Solid carriers such as clay, talc, sawdust, alfalfa meal, and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The compounds of the invention are particularly useful in combination with mosquito larvicidal petroleum oil dispersions. Petroleum oils suitable as mosquito larvicidal dispersions are known. Such hydrocarbon oils include mineral oils such as naphthenic base and paraffinic base lubricating oils, etc., as well as synthetic oils. Such hydrocarbon oils are nonphytotoxic and generally contain not more than a few percent aromatics. Particularly suitable hydrocarbon oils have boiling points above 350 to 400° F. and viscosities of from about 33 to 200 SSU at 100° F.

The amount of the compound of the invention employed in petroleum oil generally ranges from 0.1% to 10% by weight based on weight of oil. The hydrocarbon oil dispersions containing the compounds of the invention are contacted with or applied to the surface of the aqueous bodies wherein mosquito control is desired by conventional methods.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spiders, mites, ticks, centipedes, worms and the like.

Example 1.—Preparation of 2,6-di-t-butyl-4-(trichlorovinylthio) phenol

A solution of 19.8 g. (0.1 mol) trichlorovinylsulfenyl chloride in 30 ml. acetic acid was added dropwise to a solution of 20.6 g. (0.1 mol) 2,6-di-t-butylphenol in 50 ml. of acetic acid over a 1-hour period at ambient temperature. Heat and gases were evolved. The reaction mixture was stirred at about 25° C. overnight (about 16 hours). The reaction mixture was then distilled under reduced pressure to remove the acetic acid and low boiling materials (to an overhead temperature of 110° C./0.3 mm. of Hg). The pot residue solidified on cooling. The residue was chromatographed on silica gel (hexane eluant) to give the crude product as a yellow solid. Recrystallization from hexane gave product which melted at 74–76° C.

Elemental analysis showed: Calc. (percent): Cl, 28.9; S, 8.7. Found (percent): Cl, 28.6; S, 8.9.

Example 2.—Preparation of 2,6-di-sec.-butyl-4-(trichlorovinylthio) phenol

By a procedure similar to that of Example 1, 2,6-di-sec.-butyl-4-(trichlorovinylthio) phenol was prepared from 2,6-di-sec.-butylphenol and trichlorovinylsulfenyl chloride. The product was obtained as a yellow oil after chromatography on silica gel and had the following elemental analysis:

Calc. (percent): Cl, 28.9; S, 8.7. Found (percent): Cl, 28.8; S, 8.6.

Example 3

2,6-di-t-butyl-4-(trichlorovinylthio) phenol (Compound A) was tested as a morphogenetic hormonal mimetic insecticide against yellow fever mosquito larvae (*Aedes aegypti*) by the following procedure: Late fourth stage larvae of the mosquito are placed in a cup containing 200 ml. of deionized water containing a known amount of the phenol compound dissolved therein. About 20 larvae are used per test. The larvae are fed and allowed to pupate. The live pupae are kept until the adult emerges. A count is made at each step for mortality, i.e., larvae, pupae and adult mortality. For comparison, 2,6-di-t-butyl-4-($\alpha,\alpha$-dimethylbenzyl) phenol (Compound B) was also tested. The concentration and the mortality counts are tabulated in Table I.

TABLE I

| Compound: | Conc., p.p.m. | Mortality | | | |
|---|---|---|---|---|---|
| | | Larvae | Pupae | Adults | Total |
| A | 0.07 | 0 | 92.5 | 0 | 92.5 |
| A | 0.05 | 0 | 60 | 0 | 60 |
| A | 0.03 | 0 | 40 | 0 | 40 |
| A | 0.02 | 0 | 15 | 0 | 15 |
| A | 0.01 | 0 | 5 | 0 | 5 |
| B | 0.07 | 0 | 5 | 0 | 0 |
| B | 0.05 | 0 | 0 | 0 | 0 |
| B | 0.03 | 0 | 0 | 0 | 0 |
| B | 0.02 | 0 | 0 | 0 | 0 |
| B | 0.01 | 0 | 0 | 0 | 0 |

2,6-di-t-butyl-4-(trichlorovinyl) phenol was tested for the control of *Aedes aegypti* larvae by a procedure similar to that above, except that the phenol/water solution was prepared 13 days before infestation with the larvae. At a 0.3 p.p.m. concentration of the phenol, an 85% pupae mortality count was observed.

Example 4.—Petroleum oil formulation

A 1% by weight formulation of 2,6-di-t-butyl-4-(trichlorovinylthio) phenol was prepared with an oil composition having 96.1% by weight of a petroleum oil having an aromatic content of 8.4% by weight and a viscosity of 36.3 SSU at 100° F., 0.9% by weight of ethoxylated dodecyl phenol (molecular weight 526 and 6 mols ethylene oxide per mol phenol) and 3% by weight of polyisobutenyl succinic anhydride (molecular weight 950).

The oil formulation was tested for the control of *Aedes aegypti* larvae by applying a thin film of the oil formulation to a container containing 20 larvae and 170 ml. of water. The larvae are fed and allowed to pupate. After two days, a count is made of larvae and pupae mortality. At a dosage corresponding to 0.33 gallon/acre, the larvae mortality was zero and the pupae mortality was 95%.

Example 5

2,6-di-sec.-butyl-4-(trichlorovinylthio) phenol was tested as a morphogenetic hormonal mimetic insecticide against yellow fever mosquito larvae by a procedure identical to that of Example 3. At a concentration of 1.7 p.p.m., the percent pupae mortality was 5%.

We claim:
1. Compounds of the formula

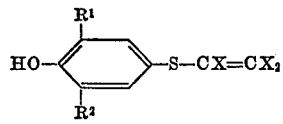

wherein $R^1$ and $R^2$ are branched alkyl of 3 to 6 carbon atoms attached to the aromatic ring through a secondary or tertiary carbon atom and X is hydrogen, fluorine, chlorine, bromine, or iodine, with the proviso that at least one X is halogen.

2. The compound of claim 1 wherein X is chlorine or bromine.

3. The compound of claim 2 wherein $R^1$ and $R^2$ are tertiary alkyl.

4. The compound of claim 1 being 2,6-di-t-butyl-4-(trichlorovinylthio) phenol.

References Cited

UNITED STATES PATENTS

| 3,155,733 | 11/1964 | Reifscheider | 260—609 F |
| 3,231,623 | 1/1966 | Reifscheider | 260—609 F |
| 3,523,146 | 8/1970 | Braus | 260—609 F |

FOREIGN PATENTS

| 245,092 | 11/1969 | U.S.S.R. | 260—609 F |

LEWIS GOTTS, Primary Examiner

D. R. PHILLIPS, Assistant Examiner

U.S. Cl. X.R.

424—337